May 27, 1930.   J. A. GRANSTEDT   1,760,643
TURNING DEVICE FOR MOTOR VEHICLES
Filed June 20, 1928
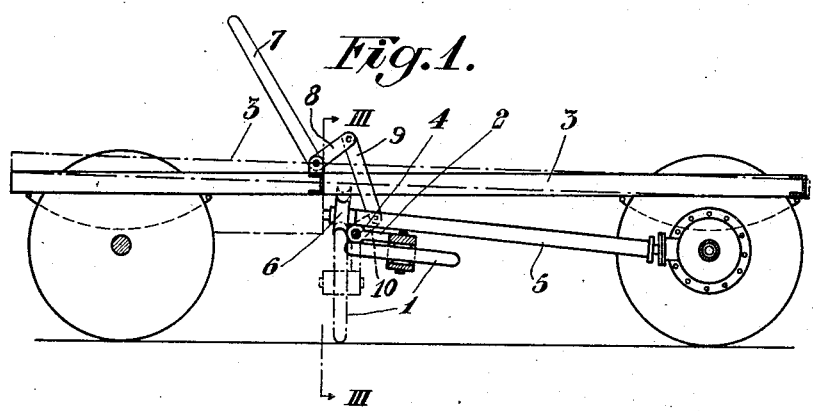
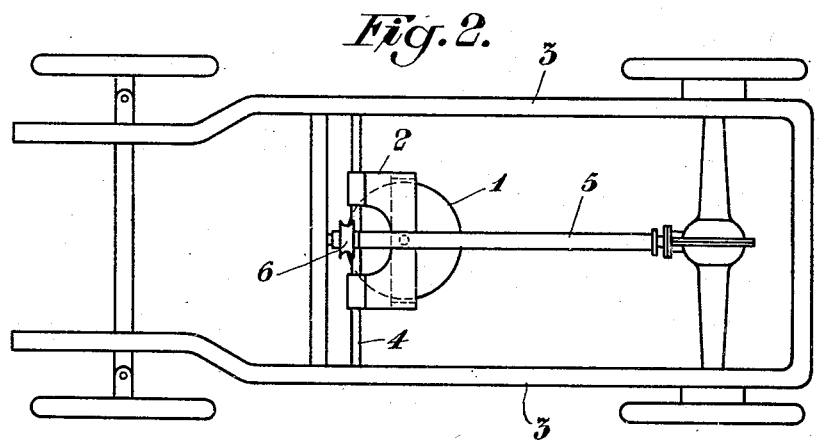
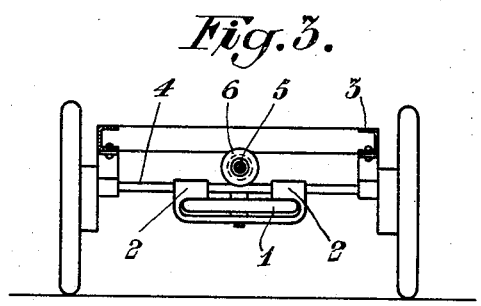
Inventor:
Johan Anshelm Granstedt
by George Bayard Jones
Attorney.

Patented May 27, 1930

1,760,643

UNITED STATES PATENT OFFICE

JOHAN ANSHELM GRANSTEDT, OF SJALEVAD, SWEDEN, ASSIGNOR OF ONE-HALF TO GUNNAR PER OLOF FOGELQVIST, OF SUNDSVALL, SWEDEN

TURNING DEVICE FOR MOTOR VEHICLES

Application filed June 20, 1928, Serial No. 286,990, and in Sweden June 27, 1927.

The present invention relates to a device by means of which a motor vehicle, for instance a motor car, may be turned in a simple and practical way in a narrow thoroughfare or other place where it is difficult to turn round in the ordinary manner.

The turning device consists of one or more auxiliary wheels which are capable of being raised and lowered, or are pivotally mounted, in such manner that they may be lowered against the ground or road surface, so that the plane of the wheel will be substantially perpendicular to the longitudinal direction of the vehicle, whereby one end of the vehicle and the wheels at said end may be raised from the ground. According to the invention, the auxiliary wheel or wheels are adapted, when lowered to the ground, to bear against a wheel or disk mounted on the engine shaft, or on a shaft driven by the engine shaft, such as the Cardan shaft, by means of which wheel or disk the auxiliary wheel or wheels may be put in rotation. By this arrangement it is possible to drive the auxiliary wheel or wheels, when lowered against the ground, from the engine of the vehicle, and thus to effect the turning of the vehicle by means of power from the engine.

An embodiment of the invention is illustrated in the accompanying drawing by way of example. Fig. 1 shows diagrammatically the frame-work of a motor car according to the invention, in side view and partly in section, and Fig. 2 shows the frame-work viewed from above, while Fig. 3 shows a section on the line III—III in Fig. 1.

As illustrated in the drawing, an auxiliary wheel 1 is rotatably mounted in a bearing or yoke 2, which in its turn is rotatably mounted on a shaft 4 secured to the front portion of the frame 3. A small wheel or disk 6 having a concave running surface, is mounted on the engine or Cardan shaft 5 and rotates with said shaft.

When the motor car is to be turned, the yoke 2 with the auxiliary wheel 1 is swung down, for instance by means of a lever 7 having an arm 8 connected by a link 9 to an arm 10 secured to said yoke until the lower portion of said auxiliary wheel 1 comes to rest against the ground, and its upper portion engages the wheel 6. By slightly reversing the motor car, the auxiliary wheel 1 will occupy the position shown in Fig. 1 in dotted and dashed lines. The wheels 1 and 6 are so dimensioned that in this position the front end of the car and the front wheels will be raised slightly from the ground. Since the wheel 6 rotates with the shaft 5, the wheel 1 will also rotate and the motor car will be turned around its rear end. If the motor car be again run ahead, the front wheels will be lowered, and the wheels 1 and 6 move out of engagement, after which the yoke 2 and the auxiliary wheel 1 may be swung up and secured in suitable manner.

In case of a puncture, or otherwise when it is desired to make repairs on the front wheels, the device above described may also serve as a lifting jack.

It will be understood that the device may also be constructed in such manner that the rear end of the motor car will be raised instead of the front end, so that the motor car will be turned around its front end.

Also in the other respects the invention is not limited to the embodiment illustrated, which has only been described as an example of the invention.

I claim:

In a turning device for motor vehicles of the character described, the combination of a motor car frame, a shaft located in the longitudinal direction of said car frame and adapted to be driven by the motor car engine, a wheel mounted on said shaft, and an auxiliary supporting wheel movably mounted in the motor car frame in such manner that it may be moved to a position with its plane substantially perpendicular to the longitudinal direction of the motor car frame and with its upper portion bearing against and supporting said first-named wheel and its lower portion bearing against the ground thereby raising one end of the motor car frame.

JOHAN ANSHELM GRANSTEDT.